(12) United States Patent
Neubauer et al.

(10) Patent No.: US 6,698,456 B2
(45) Date of Patent: Mar. 2, 2004

(54) PROTECTIVE CORRUGATED PLASTIC PIPE

(75) Inventors: Tilo Neubauer, Königsberg (DE); Sören Schröter, Bamberg (DE); Peter Winkler, Königeberg (DE)

(73) Assignee: Frankische Rohrwerke Gebr. Kirchner GmbH + Co KG, Konigsberg (DE)

( * ) Notice: Subject to any disclaimer, the term of this patent is extended or adjusted under 35 U.S.C. 154(b) by 0 days.

(21) Appl. No.: 10/093,017

(22) Filed: Mar. 7, 2002

(65) Prior Publication Data

US 2002/0139431 A1 Oct. 3, 2002

(30) Foreign Application Priority Data

Mar. 8, 2001 (DE) .......................... 101 11 215

(51) Int. Cl.[7] .............. F16L 11/00; F16L 9/00
(52) U.S. Cl. .............. 138/121; 138/114; 138/110; 138/151; 138/156; 138/178
(58) Field of Search .................. 138/110, 114, 138/156, 151, 121, 122, 177, 178, DIG. 8

(56) References Cited

U.S. PATENT DOCUMENTS

| | | | | |
|---|---|---|---|---|
| 3,885,594 A | * | 5/1975 | Tanaka | 138/129 |
| 5,560,397 A | * | 10/1996 | Miller et al. | 138/110 |
| 5,727,599 A | * | 3/1998 | Fisher et al. | 138/156 |
| 6,244,303 B1 | * | 6/2001 | Adams | 138/129 |
| 6,491,067 B1 | * | 12/2002 | Davenport et al. | 138/110 |

FOREIGN PATENT DOCUMENTS

| | | |
|---|---|---|
| DE | 19827435 | 12/1999 |
| DE | 19635986 | 5/2000 |
| DE | 19930151 | 1/2001 |

* cited by examiner

Primary Examiner—Patrick Brinson
(74) Attorney, Agent, or Firm—Raymond A. Nuzzo

(57) ABSTRACT

The invention relates to a protective corrugated plastic tube or pipe, a corrugated piping, wherein according to the invention at least some of the flanks of corrugations of the tube or pipe have extensions (16), which go from one corrugation (11a) towards a neighboring corrugation (11b) and extend in the axial direction of the protective corrugated plastic pipe.

14 Claims, 5 Drawing Sheets

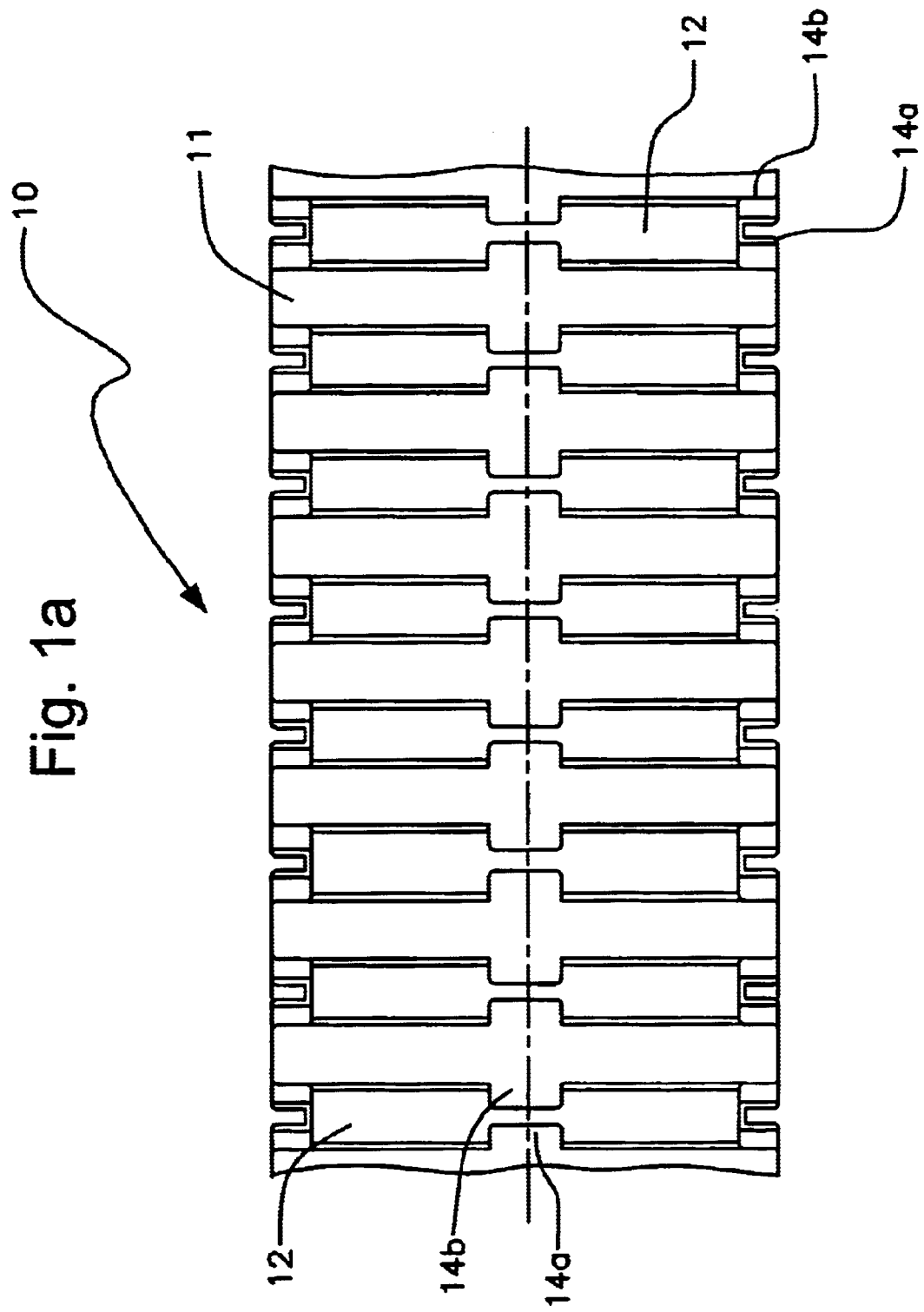

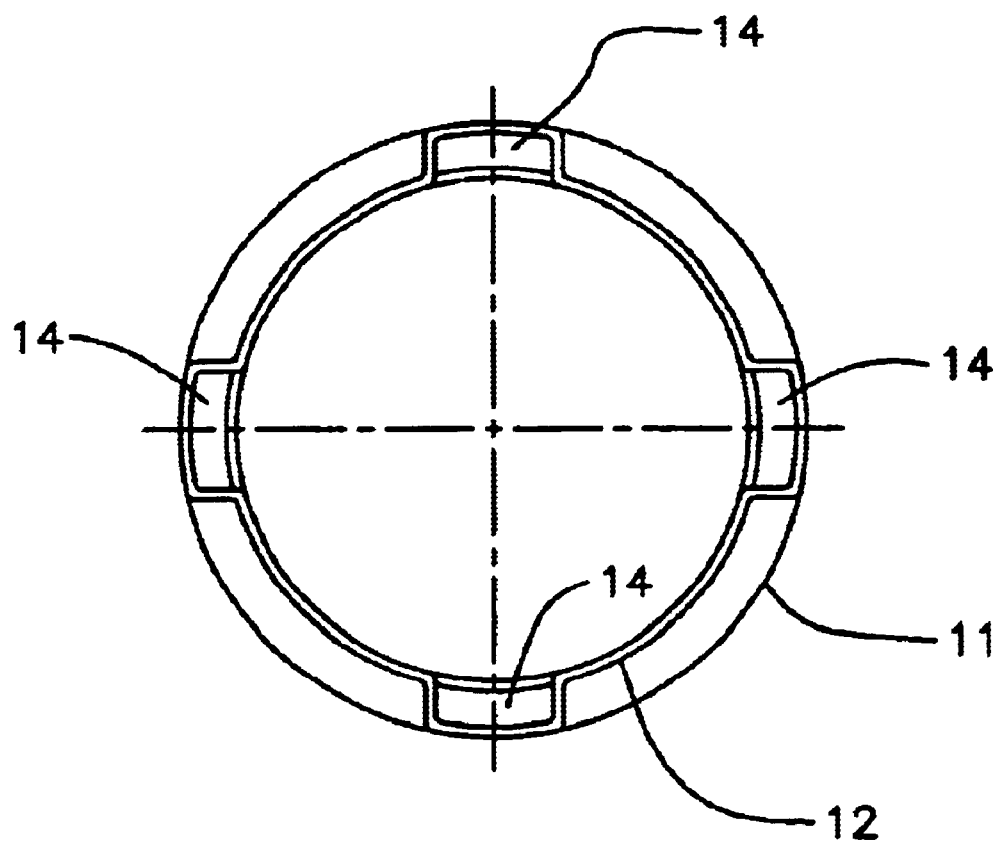

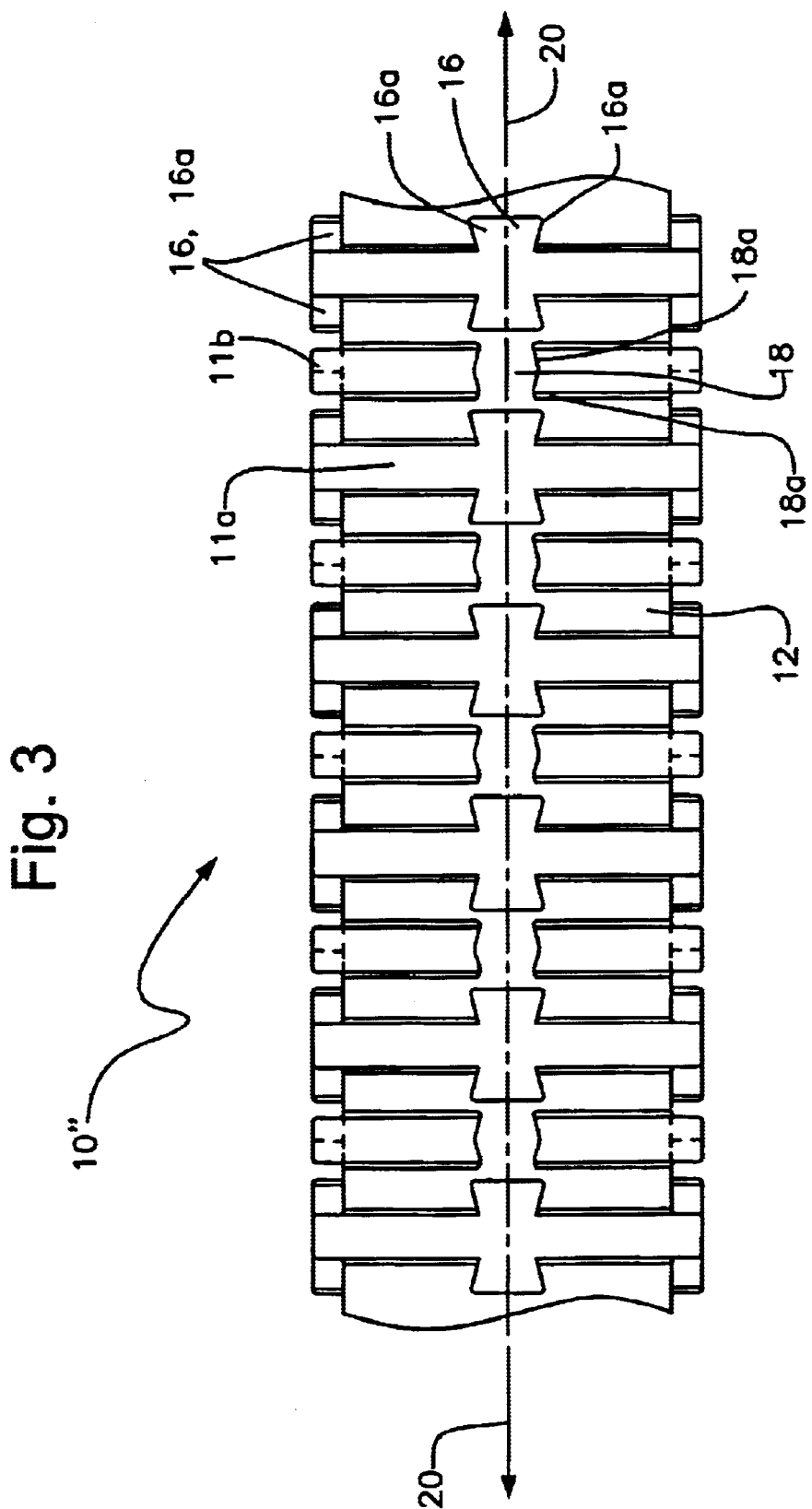

PROTECTIVE CORRUGATED PLASTIC PIPE

BACKGROUND OF THE INVENTION

1. Field of the Invention

The invention relates to a protective corrugated plastic pipe. Furthermore, the invention also encompasses a protective corrugated plastic pipe structure with a slotted outer pipe and, preferably, a slotted corrugated pipe inside.

2. Description of the Prior Art

In the known prior art, protective plastic corrugated pipes or tubes and arrangements are used, for instance, to lay fibreglass cable in the earth. Corrugated piping such as this and corrugated pipe structures or arrangements are also used for various liquids such as petrol and for gases.

A drawback of the prior art is shown when it comes to laying fibreglass cable in the earth. The protective piping is bent to such a point that the fibreglass cable is bent beyond the permitted bending radius. This can lead to the optical signal transmission being disturbed. Indeed, a fibreglass cable which has been bent in this way might allow no light through at all.

Moreover, corresponding pipes, i.e. those required for supplying fuel, may be similarly malformed such that they are no longer able to carry the necessary amount of fuel.

Furthermore, it can happen that a pipeline in the form of a corrugated pipe can also be used to carry fuel once that pipe is given a certain shape. The prior art dictates that it is necessary here to heat corrugated pipes such as these after they have been manufactured. They then assume the required shape upon cooling and during the second heating retain that shape. This could, for instance, be knee shaped or it might assume some other form.

SUMMARY OF THE INVENTION

Therefore, making available a plastic corrugated pipe or a corresponding structure which tackles the drawbacks listed above is the task in hand according to the invention. Above all, a protective plastic corrugated pipe or a protective plastic corrugated pipe structure should be created. These should be made in such a way that fibreglass cable which is to be protected by the plastic corrugated pipe or structure can be fitted so that the light getting through is not affected in any way.

The advantages which can be achieved according to the invention come about due to a protective plastic corrugated pipe in which at least some of the corrugated flanks have been fitted with extensions, which extend from one corrugated flank in the axial direction of the pipe towards a neighbouring flank. This means that it is possible that the fibreglass cable, which is in a protective plastic corrugated pipe, cannot be bent at the desired place to any point exceeding that room for manoeuvre which the extension has facilitated. This, of course, is a positive effect as it prevents the cable from breaking. Also, when the fibreglass cable has been buried in the earth in a protective plastic corrugated pipe, and movements due to thickening earth because of rain etc. occur the pipe supplies sufficient resistance in accordance with the invention. This again means that the fibreglass cable, which has been placed in the corrugated pipe, cannot be bent. Once more, this complies with the invention.

The protective plastic corrugated pipe or structure can, according to the invention, be used to protect fibreglass cables or other wiring elsewhere too. For instance, it can be used in a car engine or the like.

Likewise, a protective plastic corrugated pipe or structure with characteristics which correspond to the invention can also protect the fibreglass cable against those external threats which might occur through the environment. The long slotted outer corrugated pipe connected to the corrugated pipe inside, which holds a fibre class cable, facilitates this. The structure is formed at the desired place such that deforming or damage of the cable in the structure according to the invention is highly improbable under normal conditions. Strictly speaking, it is sufficient for the outer corrugated pipe to have the proper structure, especially since the corrugation rings on the corrugated pipe inside grip the rings on the outer corrugated pipes from inside. This provides further resistance against any deformation.

Regarding the piping, the protective plastic corrugated pipe can be slotted in an axial direction. This means that cables in general and fibre glass cables in particular can be easily fitted into the protective plastic corrugated pipe and, if necessary, can be easily replaced. Here, the long slotted pipe can be an outer pipe which can take a selected, similarly long slotted internal pipe. This internal pipe or tubing might be in the form of a non-corrugated hose.

If the long slotted internal pipe is also completely corrugated, it may be seen as an alternative to the external pipe or it may facilitate the additional function of adding to the stabilisation of the pipe vis-à-vis external forces which might deform it. Adding the necessary extensions does this.

The extensions can be fitted even if they are only to be found on the outside pipe, on both pipes or only on the external pipes. Here, they would be fitted at angles on the circumference. Nevertheless, it is especially advantageous if the extensions are connected one after another so that there is a sequence of parallel axial connections. Here, the desired properties of the protective plastic corrugated pipe, with characteristics which are in accordance with the invention, can be reliably utilised.

In order to prevent any deformation taking place due to external factors, despite the changes which have been made to the protective plastic corrugated pipe, at least two angled extensions should be attached symmetrically to the circumference of the pipe. They should be fitted in an axial position behind one another. It is especially advantageous if three extensions are placed symmetrically. The three points form three independent levels, which in turn facilitate stabilising the surfaces over the three extensions. These can have an advantageous effect in offsetting any potential damage, especially to fibreglass cables. Similarly, the same can be said for four and more extensions which are spread evenly over the circumference.

If a particular task is foreseen for the pipe according to the invention, e.g. carrying fuel, then there may be some advantage if the pipe were to assume a particular form and if it were to keep this form. Here, it would be advantageous if the extensions according to the invention were notched sections and the corresponding grooves opposite or at the end of these sections were provided as sections where the notches are clicked into place. If, e.g., there are four rows of notched sections and four corresponding sections which the notches are clicked into, then it is possible by clicking the notched sections into place to produce, for instance, a narrow knee. This will then stay in place because the process is mechanically stabile. Heat treatment, which the prior art requires here, and additional work are no longer required. On the other hand, this plastic corrugated pipe variation according to the invention is very flexible when applied, because the shape of the corrugated pipe can indeed be changed once it has been fitted in a certain way and, indeed, once changed it can keep the new form for as long as necessary.

It can also be an advantage if the internal pipe has notched extensions and/or notched sections—sections where the notches are clicked in and if the corresponding outer pipe has notched extensions and/or notched sections—sections where the notches are clicked into place. This will enable them to be clicked into one another. Where there is a slotted pipe for a structure, this process facilitates the internal pipe being more securely attached to the outer or external pipe.

The extensions can both be on the flank side of the corrugations so that the extension from one corrugation connects with the extension of another corrugation.

The cross section in the invention or structure according to the invention can be arbitrary. It can be oval, square, triangular or diagonal.

Certainly, it is also possible to put a notched section on the corrugation on each of the axial sides and to put a section for accepting the notched part on the opposite side of the same corrugation. This means that the intention would be to attach it to a connecting corrugation. However, it would be more practical from a technical point of view if there were only one notched section on a corrugation and a section for slotting it in on the other corrugation.

For technical reasons, corrugated pipes are manufactured in a "corrugator". This means that it may be necessary to shape the notched section, the section which the notches go into and the extensions in general, either in the shaping plane of the mould or in the moulding channel. Another possibility would be to perform the shaping in the level, which is vertical to the shaping plane. If the respective extensions, notched extensions or similar are formed outside these planes then the protective plastic corrugated pipe is difficult to separate from the moulds or can only be separated with a great deal of force. This might lead to the corrugated pipe product being damaged.

With reference to the protective plastic corrugated pipe structure in accordance with the invention, there are also variations which might be considered favourable. For instance, if the internal corrugated pipe had a safeguard against being twisted, such as a safeguard which slots into the slot on the outer pipe, and which is directed in the same axial direction as the extension structure originally was, and like this structure covers at least two of the neighbouring corrugations. Through this structure, which because of its cross-sectioned nature resembles a lens, shaping of the total structure can likewise be regulated or limited. This in turn facilitates limiting the flexibility of the structure further, and ensures that even where there is excessive pressure on the structure, the structure will not be deformed to such an extent that the fibreglass will be damaged. The protective plastic corrugated pipe structures according to the invention will prevent any deformation in areas, for instance, where there are strong earth movements, quakes, landslides etc.

Here too, at least two preferably lens shaped structures, which are connected by at least two corrugations, can be formed. However, a corrugation trough between the structures that follow.

In total, there should be at least three and preferably four structures over the total structure. They should be distributed uniformly, at angles, over the surface of the structure. One of these structures will then preferably serve at the same time as a safeguard against twisting, for the internal corrugated pipe vis-à-vis the external corrugated pipe.

BRIEF DESCRIPTION OF THE DRAWINGS

In the following the present invention will be examined more closely. Reference will be made to the attached figures and preferable embodiments, which have characteristics in accordance with the invention. There is shown:

FIG. 1a a side view of a protective plastic corrugated pipe with characteristics in accordance with the invention;

FIG. 1b a cross section of the pipe in accordance with FIG. 1a;

FIG. 3a side view of a further protective corrugated plastic pipe;

FIG. 4b a cross section detail of the structure according to FIG. 4a;

DESCRIPTION OF THE PREFERRED EMBODIMENTS

Figure 2A:
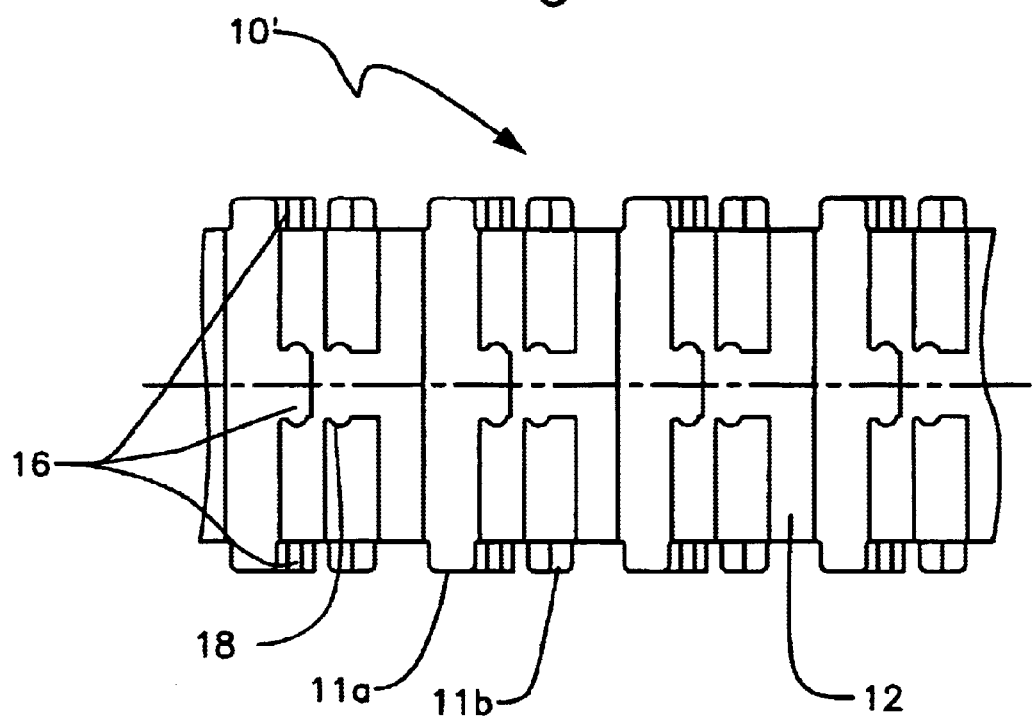
FIG. 2a side view of a further protective corrugated plastic casing or pipe.

In FIG. 1a the first protective plastic corrugated pipe model with the reference 10 is mentioned. The corrugated pipe 10 has a corrugation 11 and a corrugation trough 12. On the corrugation 11 are the extensions 14a, 14b. These stretch in the axial direction of the corrugated pipe 10. If the pipe 10 according to FIG. 1a is deformed, then the extensions 14a, 14b can be connected to the corrugation 11 and any possible deforming of the corrugated pipe is biased.

Here, of course, it is advantageous if the pipe in question processes enough firmness on its own. If this sort of corrugated pipe has walls which are too thin, or if it is made out of a material which is not very resistant, then the extensions 14a and 14b will be relatively easy to deform. This means that the extensions will be able to contribute very little when it comes to limiting any deforming which might take place in the pipe 10.

According to FIG. 1b, the extensions 14 are especially obvious in cross section. This is because the corrugated pipe according to FIG. 1a is cut in the area of the corrugation trough 12 and the extension 14 which can only be found there.

Shaping the pipe will be correspondingly limited in line with the extent to which the extensions 14 extend into a corrugation trough.

FIG. 2a shows a further protective plastic corrugates pipe model with characteristics according to the invention. This model 10' has special extensions on every second corrugation 11a. These extend in the axial direction from the corresponding flank. These extensions 16 are notched extensions and can be clicked into a corresponding section is where notches can be clicked into. These sections 18 where the notches can be clicked into are formed in the respective second corrugation 11b and face the relevant sides or flanks with the notched extensions 16 on the other corrugations.

Figure 2B:
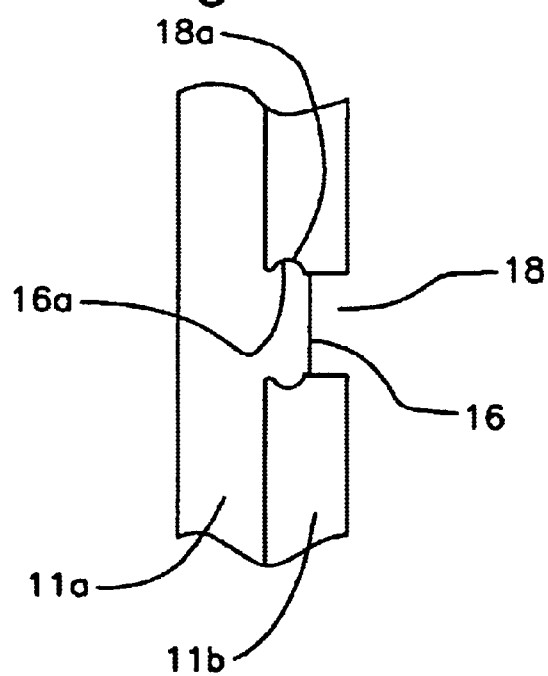
FIG. 2b a detail of the protective corrugated plastic casing or pipe in accordance with FIG. 2a, in the same perspective.

In FIG. 2b, the notched extension 16 is shown on the flank of a corrugation. It is shown how the notches click into a corresponding section 18 on a neighbouring corrugation 11b. In such instances, the corrugation trough or base of the corrugation trough is compressed and eased out so that the free section of corrugated pipe 10 can be eased in accordance with FIG. 2a. The notched section 16 clicks into place with the notched shoulder 16a in the corresponding part 18a of the section which is clicked in.

This process is relatively stabile and can only be restarted manually. This means that it is possible to intentionally lay a cable in four different directions in this way without the pipe needing any extra heating treatment or the like to be brought into a certain position. If a number of the notched extensions (i.e. 3,4 or more) 16 on the surface of the corrugation are clicked into place then this also mechanically facilitates stabilising the pipe or hindering any deforming of the corrugated pipe.

A further protective plastic corrugated pipe model 10" is shown in FIG. 3. In this corrugated pipe 10", there is a corrugation 11a for both axial extension directions 20 with a notched extension 16. The notched extensions 16 are furnished with two notched shoulders to facilitate its being clicked into the section 18 on a neighbouring corrugation 11b. The corrugation trough 12 between the individual corrugations 11a, 11b provides space so that the corrugated pipe 10" continues to have sufficient flexibility. This means that extensive deforming of the corrugated pipe is still possible. However, should a notched extension 16 via the notched shoulder be clicked into the corresponding place 18a on the section where the notches are clicked into the section 18 then the shape of the corrugated pipe 10' can be reversed. If the deformation, which in principle is reversible, is to be made irreversible, then, for instance, heating, glue or some other method will ensure that the meshing remains permanent. The meshing process should be sufficient for regularly changing the shape of the corrugated pipe 10' in accordance with the invention. It is shown that every 90° of the circumference of pipe 10' is available for a notched extension and correspondingly a section for clicking the notches into the section 18 is available every 90°. This structure or design allows for a controlled reshaping of the corrugated pipe 10" in all four directions on the axis 20 of the corrugated pipe.

In the figures, similar components are represented by more or less identical points of reference. This means that repeating the description is superfluous.

Figure 4A:
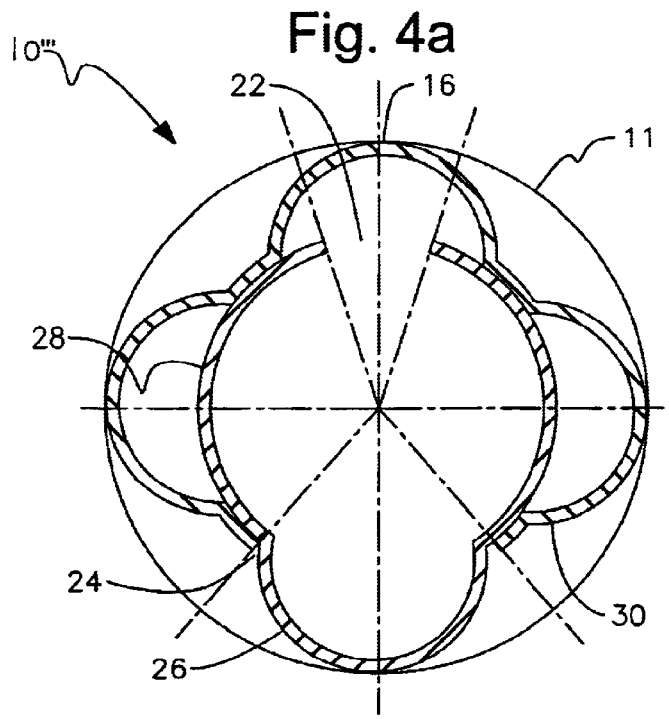
FIG. 4a a dissection of a protective plastic corrugated pipe structure with characteristics in accordance with the invention.

In FIG. 4a, a cross section of a protective plastic corrugated pipe structure model to be realised is represented. This model shows characteristics in accordance with the invention. Here, an external or outer pipe 30 surrounds a preferred internal pipe 28. The internal pipe 28 and the external pipe 30 each point to the slots, 22, 24 respectively. These slots facilitate the placing of cable in general, and glass cable in particular if desired, and after the internal pipe 28 has been surrounded by the external pipe 30 the cable is reliably protected against environmental influences.

The internal pipe 28 comprises a safeguard 26 against twisting. This ensures that the internal pipe is kept in a defined position vis-à-vis the external pipe 30. The safeguard 26 is held by an external corrugated pipe end piece which is formed by the slot 24 of the external pipe.

The corrugations 11 of the protective pipe structure 10''' are fitted with extensions. These extensions have a limiting effect on the flexibility of the structure 10'''. However, the mechanical resistance is increased. The safeguard 26 against twisting should also preferably be a corresponding extension. The extensions is furnish a representation of this. Likewise, this means that, if desired, it is possible to strongly influence the flexibility of the protective pipe structure according to FIG. 4.

The type of models according to FIGS. 1a to 3 could, in fact, have long slots in the direction of the axial. Both here and in the type of model according to FIG. 4a it is then possible to later replace cable, in particular glass fibre cable, without any great effort being required.

Figure 4B:
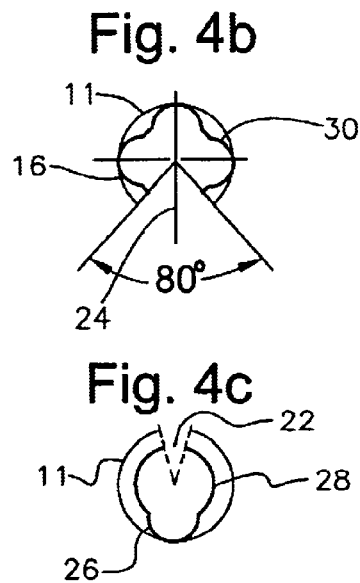
Figure 4C:
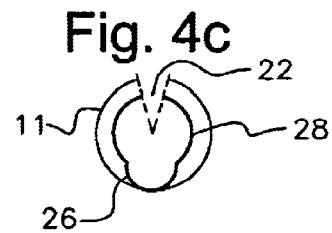
FIG. 4c another part of the structure according to FIG. 4a, also in a diagonal view.

FIGS. 4b and 4c show details of the external pipe 30 and the internal pipe 28. The structure is in accordance with FIG. 4a. The respective slots 24, 22 from the external and internal pipes 28 and 30 are, once again, illustrated in FIGS. 4b and 4c.

Above all, a stiffening of the structures according to FIGS. 4a to 4c occur because the corrugations on the internal pipe 11 are meshed into the external pipe.

Figure 5A:
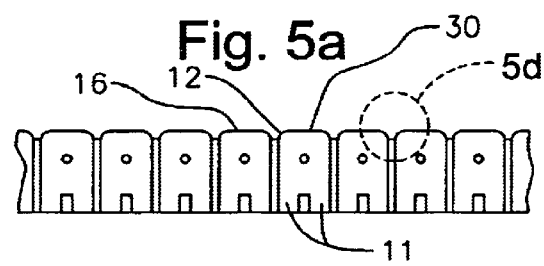
FIGS. 5a–5c a side view of the part according to FIGS. 4a to 4c.
Figure 5D:
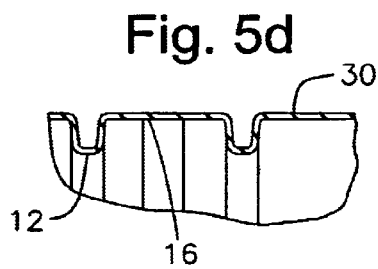
FIGS. 5d and 5e a detail according to FIGS. 5a and 5b representating the length.
Figure 5B:
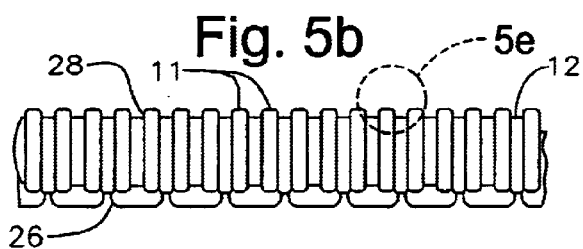
Figure 5E:
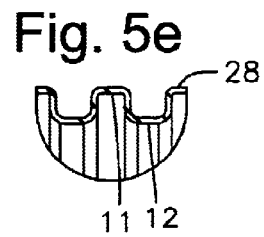
Figure 5C:
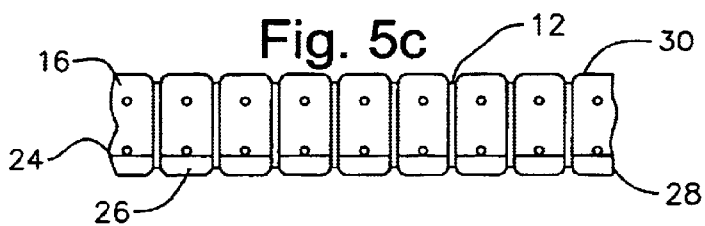

This is also especially the case with FIGS. 5a to 5c as well as 5d and 5e. The individual corrugations 11 on the internal pipe according to FIG. 5b are positioned such that they are in the process of meshing with the external pipe according to FIG. 5a. The stiffening extensions 16 according to FIG. 5a are formed on their inner radius in such a way that they do not prevent this meshing but merely ensure that there is a lessening of the corrugated pipe structure's total flexibility in accordance with FIG. 4a and FIG. 5c respectively. This also holds for the safeguard 26 against twisting and the stiffening extension according to FIG. 5b.

FIG. 5c shows how the safeguard 26 against twisting, which can also serve as a stiffening extension, is placed in the slot 24.

FIGS. 5d and 5e show how the corrugation distance for the internal and external pipes 28, 30 is measured such that they can mesh with one another. This also contributes to the stability.

What is claimed is:

1. A protective corrugated plastic pipe with a thin-walled pipe body with circumferential corrugations, wherein at least some flanks of said corrugations have extensions which extend from one corrugated flank in the axial direction of the pipe towards a neighbouring corrugated flank and wherein said extensions are visible from outside said pipe body.

2. A protective corrugated plastic pipe with a thin-walled pipe body with circumferential corrugations wherein at least some flanks of said corrugations have extensions which extend from one corrugated flank in the axial direction of the pipe towards a neighbouring corrugated flank wherein the pipe is slotted in the longitudinal direction.

3. The protective corrugated plastic pipe according to claim 2, wherein the longitudinally slotted pipe is an external or outer pipe, in which a likewise longitudinally slotted internal pipe is preferably placed.

4. The protective corrugated plastic pipe according to claim 3, wherein the preferably longitudinally slotted internal pipe is circumferentially corrugated, wherein these corrugations are preferably formed alternatively instead of the external or outer pipe or in addition to the external or outer pipe with the corresponding extensions.

5. The protective corrugated plastic pipe according to claim 1, wherein the extensions follow in an axial direction one behind the other.

6. A protective corrugated plastic pipe with a thin-walled pipe body with circumferential corrugations wherein at least some flanks of said corrugations have extensions which extend from one corrugated flank in the axial direction of the pipe towards a neighbouring corrugated flank, wherein the extensions are provided at least two and preferably three places which are evenly placed with respect to their angle-related location.

7. A protective corrugated plastic pipe with a thin-walled pipe body with circumferential corrugations wherein at least some flanks of said corrugations have extensions which extend from one corrugated flank in the axial direction of the pipe towards a neighbouring corrugated flank, wherein the extensions are notch sections and wherein in the opposite or following corrugations to the notch sections, corresponding accommodation sections are provided, for receiving the notch.

8. A protective corrugated plastic pipe with a thin-walled pipe body with circumferential corrugations wherein at least some flanks of said corrugations have extensions which extend from one corrugated flank in the axial direction of the pipe towards a neighbouring corrugated flank, wherein the extensions are provided at both sides of the flanks, at least some of the corrugations being partly corrugated.

9. The protective corrugated plastic pipe according the claim 8, wherein alternatively there are formed notch sections on both sides of one corrugation and in a neighbouring corrugation there are corresponding accommodation sections.

10. A protective corrugated plastic pipe structure with a longitudinally slotted external or outer pipe and with a preferably longitudinally slotted internal corrugated pipe, wherein at least two neighbouring corrugations of the external corrugated pipe are connected via at least one structure which is extended in both an axial direction and a circumferential direction, wherein the corrugations of the internal corrugated pipe preferably mesh with the corrugations of the external corrugated pipe.

11. The protective corrugated plastic pipe structure according to claim 10, wherein the internal corrugated pipe has a twisting safeguard means which engages into the slot of the external corrugated pipe, wherein the twisting safeguard means preferably has a structure which extends in both the axial direction and the circumferential direction, said structure extending over at least two neighbouring corrugations.

12. The protective corrugated plastic pipe structure according to claim 10, wherein at least two preferably lens or lentil-shaped extensions are formed over the circumference of the structure, said extensions connecting at least two subsequent corrugations, wherein each corrugation trough remains at least partly free between the subsequent extensions.

13. The protective corrugated plastic pipe structure according to claim 11, wherein there are at least three and preferably four extensions evenly distributed over the circumference of the structure, one extension serving as a twisting safeguard means for the internal corrugated pipe vis-à-vis the external corrugated pipe.

14. The protective corrugated plastic pipe structure according to claim 12, wherein there are at least three and preferably four extensions evenly distributed over the circumference of the structure, one extension serving as a twisting safeguard means for the internal corrugated pipe vis-à-vis the external corrugated pipe.

* * * * *

UNITED STATES PATENT AND TRADEMARK OFFICE
CERTIFICATE OF CORRECTION

PATENT NO. : 6,698,456 B2
DATED : March 2, 2004
INVENTOR(S) : Tilo Neubauer et al.

It is certified that error appears in the above-identified patent and that said Letters Patent is hereby corrected as shown below:

<u>Column 3,</u>
Line 57, after "follow" and before ".", please insert -- each other in the direction of the axis should be kept at least partly free in order to retain sufficient flexibility --.

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,698,456 B2
DATED : March 2, 2004
INVENTOR(S) : Neubauer et al.

It is certified that error appears in the above-identified patent and that said Letters Patent is hereby corrected as shown below:

Column 4,
Line 54, please delete "corrugates" and replace with -- corrugated --.
Line 59, please delete "is" and replace with -- 18 --.

Column 5,
Line 64, please delete "is" and replace with -- 16 --.

Signed and Sealed this

Twenty-fourth Day of August, 2004

JON W. DUDAS
*Director of the United States Patent and Trademark Office*